(12) United States Patent
Dye (10) Patent No.: US 7,029,019 B1
(45) Date of Patent: Apr. 18, 2006

(54) ATTACHMENT FOR A HOST VEHICLE FOR MOVING A SELECTED ITEM

(76) Inventor: Steven Dye, 7080 Kettleview Dr., West Bend, WI (US) 53090

( * ) Notice: Subject to any disclaimer, the term of this patent is extended or adjusted under 35 U.S.C. 154(b) by 15 days.

(21) Appl. No.: 10/456,891

(22) Filed: Jun. 9, 2003

(51) Int. Cl.
*B60F 63/00* (2006.01)

(52) U.S. Cl. ................... 280/416.2; 280/416.1

(58) Field of Classification Search .. 280/416.1–416.3, 280/417.1; 414/703, 912, 920, 462, 685, 414/686, 930
See application file for complete search history.

(56) References Cited

U.S. PATENT DOCUMENTS

| | | | | |
|---|---|---|---|---|
| 3,472,528 A | * | 10/1969 | Richey et al. | 280/416.2 |
| 3,698,740 A | * | 10/1972 | Chisholm et al. | 280/491.4 |
| 3,810,661 A | * | 5/1974 | Lowrance | 280/417.1 |
| 3,815,936 A | * | 6/1974 | Oaks, Jr. | 280/417.1 |
| 3,940,000 A | | 2/1976 | Mousel | |
| 3,968,981 A | * | 7/1976 | Suarez | 280/511 |
| 4,340,240 A | * | 7/1982 | Anderson | 280/461.1 |
| 4,484,759 A | * | 11/1984 | Zwick | 280/460.1 |
| 4,850,789 A | | 7/1989 | Zimmerman | |
| 4,897,013 A | * | 1/1990 | Thompson et al. | 414/703 |
| 5,026,247 A | | 6/1991 | Zimmerman | |
| 5,098,252 A | * | 3/1992 | Sheesley et al. | 414/723 |
| 5,178,505 A | * | 1/1993 | Smith | 414/24.5 |
| 5,540,537 A | * | 7/1996 | Welch | 414/462 |
| 5,657,825 A | * | 8/1997 | Englund | 172/439 |
| 6,030,170 A | * | 2/2000 | Lewis | 414/703 |
| 6,119,377 A | * | 9/2000 | Rubio | 37/403 |
| 6,152,675 A | * | 11/2000 | Compton | 414/543 |
| 6,361,062 B1 | * | 3/2002 | Edin et al. | 280/416.2 |

OTHER PUBLICATIONS

King Kutter Inc. Page from website www.kingkutter.com showing a boom pole. Viewed Sep. 11, 2003. Unknown publication date.

Northern Tool and Equipment Co. Page from website www.northerntool.com showing item # 124,692. Viewed Sep. 10, 2003. Unkknown publication date.

\* cited by examiner

*Primary Examiner*—Lesley D. Morris
*Assistant Examiner*—L. Lum
(74) *Attorney, Agent, or Firm*—Brannen Law Office, LLC (57) ABSTRACT

The present invention is an attacher having a receiver extending rearward and a boom extending upward and rearward from a base. One or more connectors, such as a gooseneck hitch or a hook, can be at the distal end of the boom. The boom is supported by a pair of bent arms that interconnect the base and the boom. The bent arms connect to the boom near the distal end of the boom. The present invention can connect directly to a three point hitch of a host vehicle, or to an adapter plate having a three point hitch. To accomplish this, two pins extend out from opposed ends of the base and a U-shaped bracket is on the boom. At least one plate can be recessed within the base to anchor the pins to the base, in addition to welding the pins to the base.

44 Claims, 10 Drawing Sheets

ATTACHMENT FOR A HOST VEHICLE FOR MOVING A SELECTED ITEM

BACKGROUND OF THE INVENTION

1. Field of the Invention

The present invention relates generally to an attachment for a host vehicle, and more particularly to an attachment to a host vehicle for moving a selected item that is rigidly constructed and can pull or lift heavy objects.

2. Description of the Related Art

Many objects need to be moved from time to time. Sometimes, moving an intended object can be accomplished without the aid of a machine. That is, the object is light enough and small enough so that a person can safely lift, push, pull or otherwise move the object. People use machines to move objects that they cannot safely lift, push, pull or otherwise move.

Of the many available machines, some of the most commonly used host vehicles are tractors and skid loaders. These and other types of host vehicles use interchangeable attachments made for being removeably connected to the host vehicle. A tractor frequently has a three point hitch, which is a type of hitch that is well understood in the industry. Skid loaders are also widely used in the industry, and their respective attachment mechanisms are well understood. Of course, many interchangeable attachments have been developed for these and other types of vehicles.

Sometimes, people use common or standard attachments for unintended purposes. For example, people sometimes loop a chain over the distal end of a fork lift attachment, and then move about with heavy objects suspended by the chain. The dangers of using a fork lift attachment in this manner are apparent, because a fork lift attachment normally has no mechanism to ensure that the chain will remain in place on the fork lift attachment. Other examples of unnecessary risk may immediately come to mind. In an attempt to avoid this and other inherently dangerous situations, use specific attachments have been developed. For example, a hook has been proven effective at securely holding a chain. Several other examples are provided below. While those attachments perform well for their intended purpose, they each can be improved upon.

One example is used with a three point hitch and has a receiver and the capability to tow gooseneck trailers. This three point hitch adapter is presently marketed by Northern Tool and Equipment Catalog Co. of Burnsville, Minn. on its website, northerntool.com. under item number 124,692. The gooseneck hitch is not offset from the remainder of the adapter. This is undesirable because the remainder of the adapter can interfere with the use of the gooseneck hitch. When attached to a three point hitch, the gooseneck hitch is undesirably close to the rear of the tractor. This potentially results in the gooseneck hitch causing discomfort to the driver of the tractor because the driver's back can rub against the gooseneck hitch. Further, the items attached to the gooseneck hitch can contact the back of the tractor when the tractor makes a sharp turn, potentially damaging the tractor and the items being moved by the tractor.

U.S. Pat. Nos. 5,026,247 and 4,850,789 to Zimmerman show an interfacing lift hitch. FIG. 5 of U.S. Pat. No. 5,026,247 shows a tow bar extending through the base. Yet, no standard two-inch tow bar is shown. Further, extending the tow bar through the base is undesirable in that the portion of the tow bar that extends through the base can get caught on other objects, and is exposed to the elements. Exposing the end of the tow bar to the elements can accelerate rust buildup, and can effectively prevent removal of the tow bar from the base.

U.S. Pat. No. 3,940,000 to Mousel shows a hydraulic lift attachment for tractors, wherein the frame is supported by the tractor drawbar. No receiver is shown for connecting a drawbar for pulling another object. A boom is shown to pivot about a tubular member. A pivotal connection is undesirably weaker than a stationary connection and also is undesirably more complicated. Any malfunction, either in the individual moving components or the links, can cause the entire attachment to fail.

French Publication Number 2,587,017 to Andrieux shows an attachment. In particular, FIG. 1 of this publication shows a moveable boom with a hook and a base having offset plates. The offset plates do not appear to be compatible with attachments that are insertable into a standard receiver. Further, no gooseneck hitch is shown. The moveable boom lacks the structural rigidity that a rigidly fixed boom would have, is undesirably complicated, and is at an increased risk of failure.

Kingkutter Incorporated of Winfield, Ala. manufactures a boom pole having model designation "BP." This boom pole has bracing attached to the base and boom. That bracing is straight and attaches to the boom far removed from the distal end of the boom. A reinforcement bar is shown apparently to give support to the distal end of the boom. Use of the reinforcement bar adds to the number of parts of the boom pole, which undesirably adds to the complexity of the design. Further, the location of the reinforcement bar prevents the boom pole from having a connector, such as a gooseneck hitch, on the top of the boom. Several other features of the Kingkutter Incorporated boom pole are also undesirable. First, the lift pins appear only to be welded to the base. Second, two plates are shown to be merely welded to the boom. The two pins and two plates connect the boom pole to a tractor's three point hitch. Yet, this connection is undesirably weak because of how the two pins and two plates are connected to the boom pole, respectively. These connections can have a limiting affect on the capacity of the boom pole. Still further, the Kingkutter Incorporated boom pole only shows a lifting loop. This boom pole therefore has an undesirably limited practicality.

Thus, there exists a need to solve these and other problems.

SUMMARY OF THE INVENTION

The present invention is an attachment that attaches to a host vehicle to aid in moving intended objects, such as those objects that are too large or heavy to be moved by a person, without the aid of a machine.

The attachment has a base. A receiver extends rearward from the base and can receive a standard two inch tow bar. A boom having a distal end extends upward and rearward from the base. One or more connectors can be at the distal end of the boom. Two preferred connectors are a hook and a gooseneck hitch. For added flexibility, the gooseneck hitch can be removable from a shaft that is, in turn, rigidly connected to the boom. In this regard, different sized gooseneck hitches or other types of attachments can be connected to the shaft.

According to a further aspect of the invention, the boom is supported by a pair of arms that interconnect the base and the boom. The arms are preferably bent arms and the combination of arms and boom creates a structurally strong truss. The bent arms connect to the boom near the distal end of the boom. The arms provide adequate support to the distal end of the boom without the need for any additional bracing at the distal end of the boom, and without preventing the use of a connector on the top of the boom. Also, the bent arms maintain a large clearance over the receiver such that the arms do not interfere with use of the receiver.

According to another aspect of the present invention, it can connect directly to a three point hitch of a tractor. This is accomplished by two pins that extend out from opposed ends of the base and a bracket on the boom. At least one plate can be recessed within the base to anchor the pins to the base, in addition to welding the pins to the base. The bracket is generally U-shaped, and it wraps around the boom in addition to being welded to the boom. The anchored pins and U-shaped bracket are structurally strong, and ensure that the capacity of the present invention is not unnecessarily reduced.

According to yet another aspect of the present invention, the attachment can be used with an adapter to be attached to a skid loader. One such adapter found suitable is sold by FFC Attachments located in Lee. Ill., and sold under the name 3-Point Bracket. Also, the attachment of the present invention can be adapted for direct attachment to a skid loader. This can be accomplished by welding the attachment of the present invention to an adapter plate. Hence, the present invention is adaptable for use with multiple types of host vehicles.

Other advantages, benefits and features of the present invention will become apparent to those skilled in the art upon reading the specification and studying the Figures.

DETAILED DESCRIPTION OF THE PREFERRED EMBODIMENTS

While the invention will be described in connection with several preferred embodiments, it will be understood that it is not intended to limit the invention to those embodiments. On the contrary, it is intended to cover all alternatives, modifications and equivalents as may be included within the spirit and scope of the invention as defined in the appended claims.

The present invention is adapted for use with a host vehicle 5. One highly preferable host vehicle 5 is a tractor 10. However, the present invention can be adapted for use with other host vehicles, such as a skid loader, without departing from the broad aspects of the invention. The tractor 10 has a longitudinal axis 11. A three point hitch 15 is at the rear of the tractor 10. The three point hitch 15 comprises two slots 16 and an attacher 17. The slots 16 are located a predetermined and customary distance apart, and the attacher 17 is located at a predetermined and customary location above the slots. One or more hydraulic cylinders 18 are used to lift or move the three point hitch 15. Three point hitches 15 are widely used and are well understood in the industry.

In accordance with the present invention, an attachment 50 is provided. The attachment 50 is preferably made of steel. However, other strong materials may be used without departing from the broad aspects of the present invention. In the preferred embodiment, the host vehicle 5 preferably has a large lifting capacity, and the material strength is more important that material weight.

The attachment 50 has a base 60, as shown in FIGS. 1 and 3–6. The base 60 has a front 61, a back 62, a top 63 and a bottom 64. The front 61 and back 62 are comprised of plates that are generally parallel to each other. The top 63 and bottom 64 are also comprised of plates that are generally parallel to each other. The base 60 preferably has a generally rectangular cross-sectional shape. The base 60 has a first end 65 comprising a plate having a hole 66 therethrough. The base also has a second end 67 comprising a plate having a hole 68 therethrough. It is preferred that the front 61, back 62, top 63, bottom 64, first end 65 and second end 67 are welded together to form a generally box shaped base. The base 60 has a base axis 69, which is generally parallel to the front 61, back 62, top 63 and bottom 64, and generally perpendicular to the first end 65 and second end 67.

A first pin 75 is connected to the first end 65 of the base 60. It is preferred that the first pin 75 is welded to the first end 65 of the base 60. In this regard, the first pin 75 has a free end 76 remotely extending from the first end 65 in a direction generally parallel to the base axis 69. A weld 77 secures the first pin 75 to the first end 65 of the base 60. In an additional feature of the present invention, shown in FIG. 6, a first recessed plate 78 can be embedded within the base 60 to anchor the first pin 75 to the base. The first recessed plate 78 is preferably generally parallel to the first end 65 and is preferably welded to the front 61, back 62, top 63 and bottom 64 of the base. The first recessed plate 78 is preferably offset a few inches from the first end 65 of the base 60. In this regard, the first pin 75 extends though the hole 66 in the first end 65. The first pin 75 can be welded or otherwise connected to the recessed plate 78 in addition to being welded to the first end 65 of the base 60. This type of double securement of the first pin 75 improves the structural capacity of the first pin 75 and reduces the risk that the first pin will fail.

A second pin 80 is connected to the second end 67 of the base 60. It is preferred that the second pin 80 is welded to the second end 67 of the base 60. In this regard, the second pin 80 has a free end 81 remotely extending from the second end 67 in a direction generally parallel to the base axis 69. A weld 82 secures the second pin 80 to the second end 67 of the base 60. In an additional feature of the present invention, shown in FIG. 6, a second recessed plate 83 can be embedded within the base 60 to anchor the second pin 80 to the base 60. The second recessed plate 83 is preferably generally parallel to the second end 67 and is preferably welded to the front 61, back 62, top 63 and bottom 64 of the base 60. The second recessed plate 83 is preferably offset a few inches from the second end 67 of the base 60. The second pin 80 extends through hole 68 in the second end 67 of the base 60. The second pin 80 can be welded or otherwise connected to the recessed plate 83 in addition to being welded to the second end 67 of the base 60. This type of double securement of the second pin 80 improves the structural capacity of the second pin 80 and reduces the risk that the second pin will fail.

As an alternative to the first recessed plate 78 and second recessed plate 83, a single recessed plate (not shown) can be within the base for simultaneously anchoring both the first pin 75 and second pin 80 to the base. As a further embodiment yet, the first and second pins 75 and 80 can be comprised of a single piece of material (not shown) that extends through both the holes 66 and 68 in the first and second ends 65 and 67, respectively, of the base 60.

Figure 1:
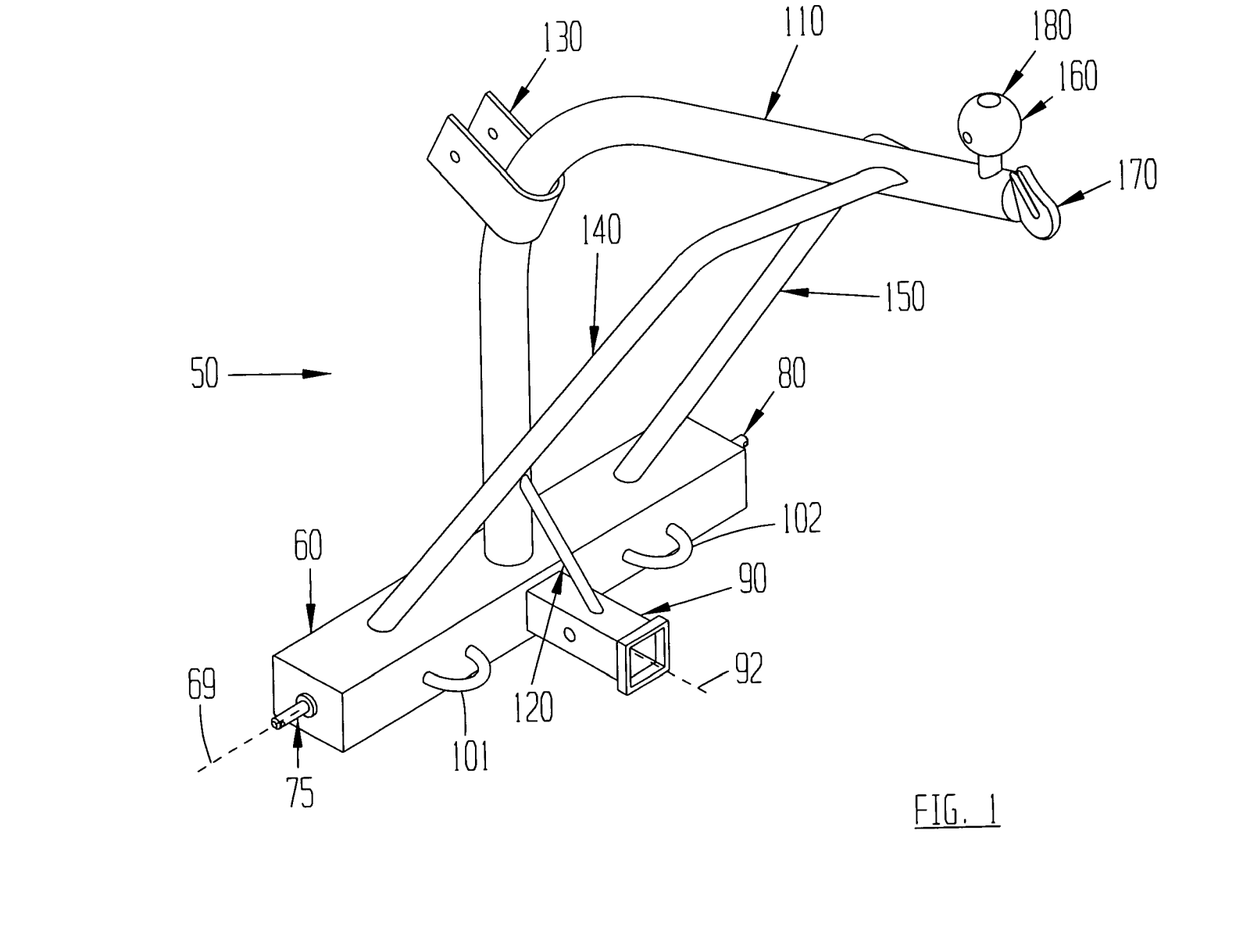
FIG. 1 is a perspective view of the present invention.
Figure 2:
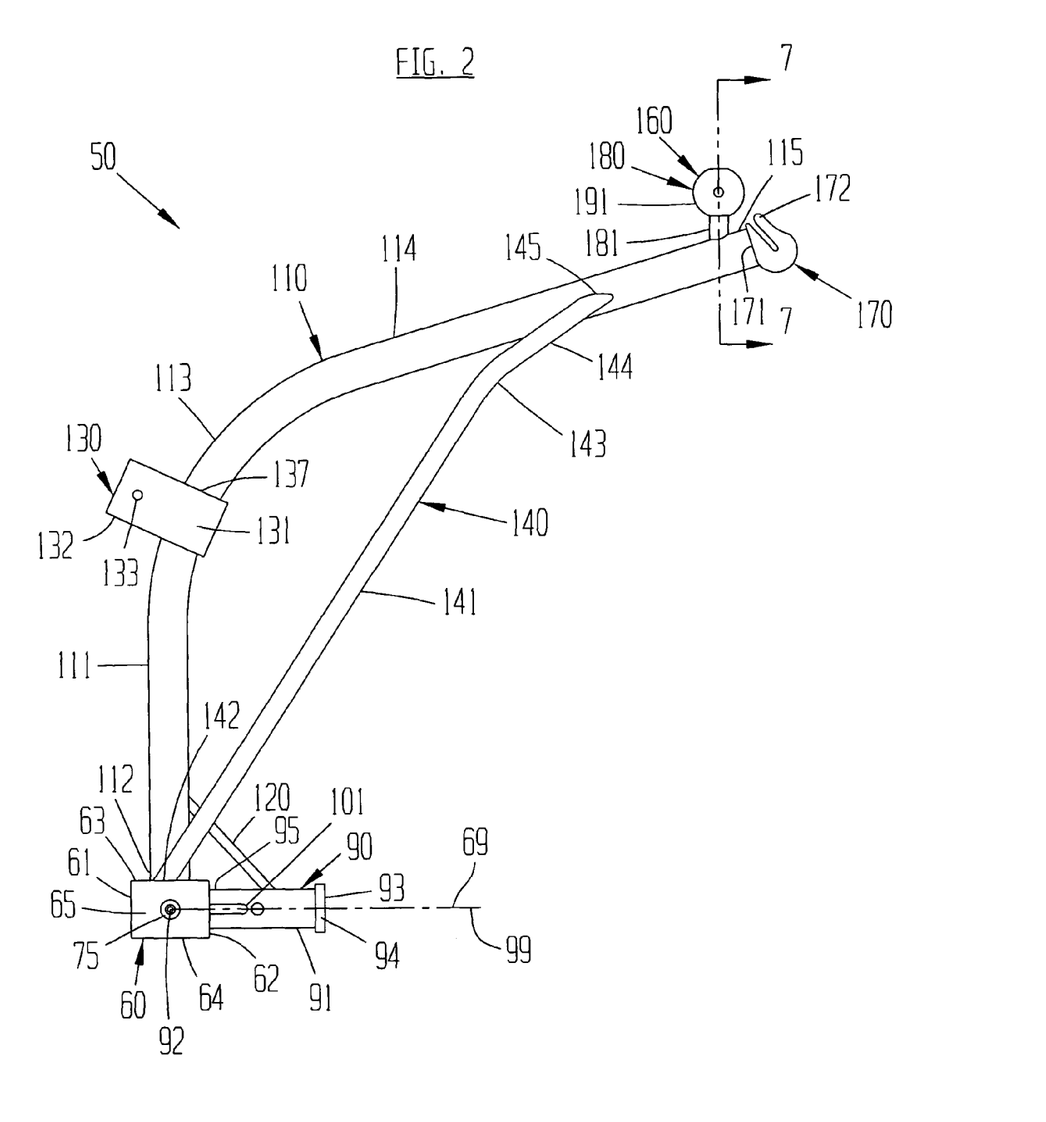
FIG. 2 is a side view of the present invention shown in FIG. 1.
Figure 4:
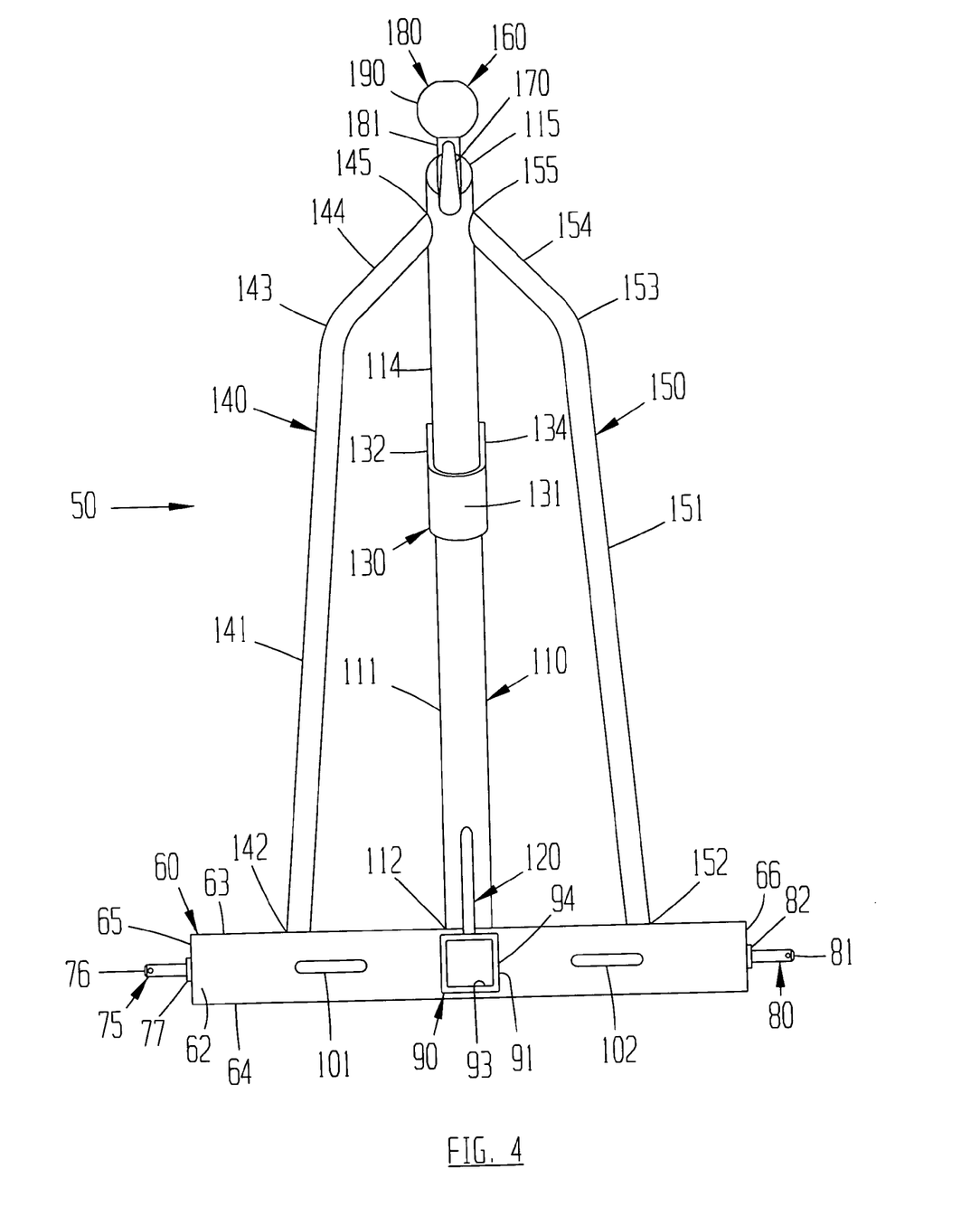
FIG. 4 is a back view of the present invention shown in FIG. 1.
Figure 6:
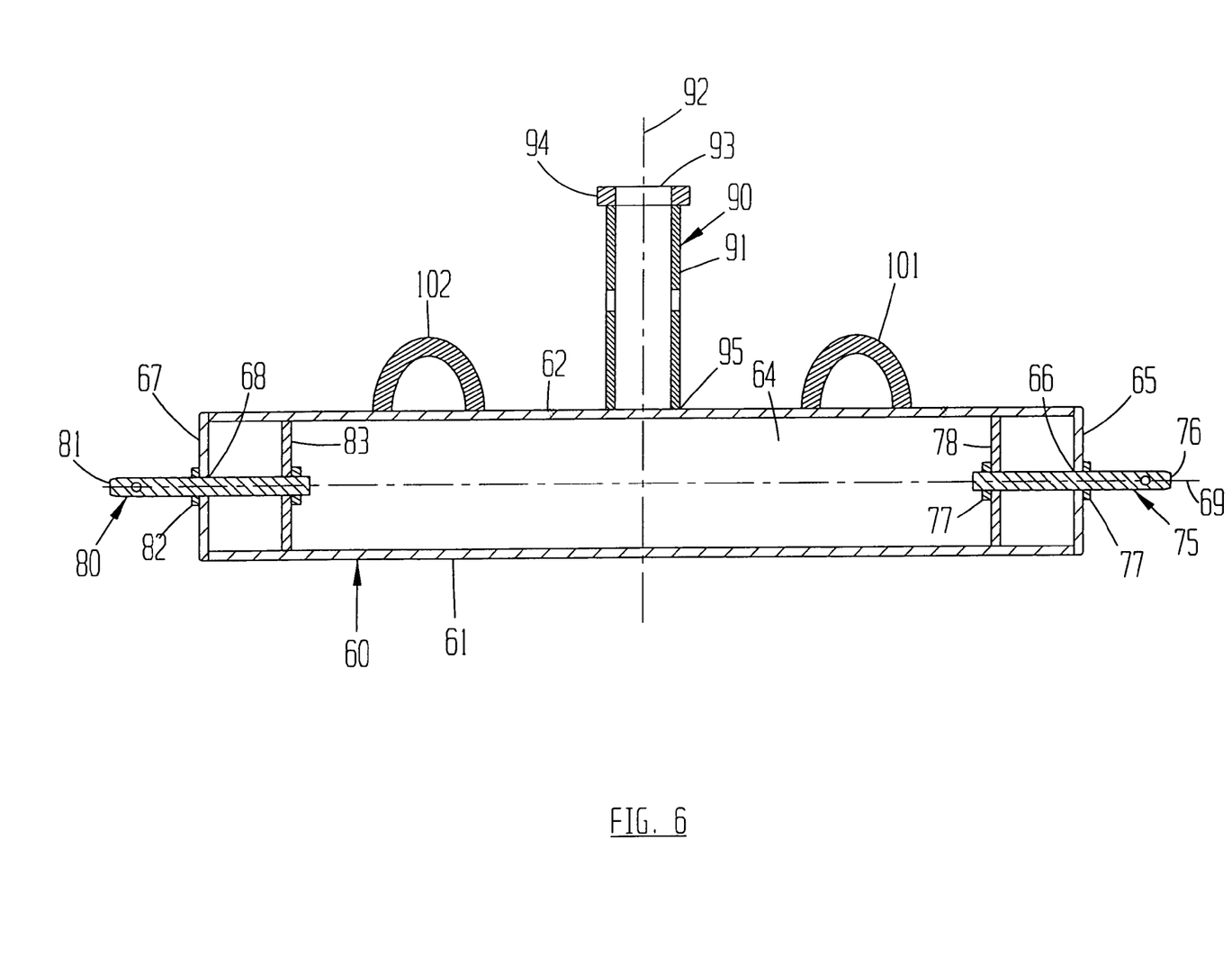
FIG. 6 is a cross-sectional view of the base taken along line 6—6 in FIG. 3.

In accordance with another aspect of the present invention, a receiver 90 is connected to the back 62 of the base 60 at a location generally half way between the base first end 65 and second end 67, as best shown in FIGS. 1, 4 and 6. The receiver 90 preferably extends rearwardly from the base 60 a distance of between approximately 6 inches and 1 foot. However, the receiver 90 can extend a greater or smaller distance from the base 60 without departing from the broad aspects of the present invention. The receiver 90 preferably terminates at the base 60. The receiver 90 is preferably welded to the base 60. The receiver 90 has a receiver body 91 with a receiver axis 92. The receiver axis 92 is preferably perpendicular to the base axis 69. The receiver axis 92 and base axis 69 define a plane 99. As shown in FIG. 2, the receiver body 91 has an open end 93 with a lip 94 thereon. The receiver body 91 also has a terminal end 95, which terminates at the base 60. The receiver 90 is preferably a receiver of standard size, such as a two inch square receiver. A standard hitch 97 can be inserted into the open end 93 of the body 91. A pin can extend through the receiver body 91 and the standard hitch 97 in a customary manner to removeably secure the standard hitch 97 in place within the receiver body 91.

As seen in FIGS. 1 and 6, a first chain eye 101 is preferably connected to the back 62 of the base 60 intermediate between the receiver 90 and base first end 65. The first chain eye has two ends that are preferably welded to the base 60. Similarly, a second chain eye 102 having two ends is preferably welded to the base 60. The second chain eye 102 is preferably located on the back 62 of the base intermediate between the receiver 90 and the base second end 67.

In accordance with another aspect of the present invention, a boom 110 is provided. The boom 110 is best shown in FIGS. 1–5. The boom 110 is preferably made from steel tubing. However, other strong materials, or steel having a different configuration can be used without departing from the broad aspects of the present invention. The boom 110 preferably extends rearwardly from the base 60 by a distance of approximately between 2.5 feet and 3 feet. However, the boom 110 could extend rearwardly a greater of smaller distance from the base 60 without departing from the broad aspects of the present invention. The boom 110 preferably extends upwardly from the base 60 by a distance of approximately between 2.5 feet and 3 feet. However, the boom 110 could rise a greater of smaller amount from the base 60 without departing from the broad aspects of the present invention.

The boom 110 has a lower portion 111 that is preferably connected to the base 60. In a preferred embodiment, the lower portion 111 of the boom 110 has an end 112 that is welded to the top 63 of the base. End 112 is the first end of the boom 110. In this preferred embodiment, the lower portion 111 extends up from the base 60 in a direction generally perpendicular to the plane 99 defined by the base axis 69 and receiver axis 92. The boom 110 also has a bent portion 13 and an upper portion 114. The upper portion 114 of the boom 110 has an end 115. End 115 is the second end of the boom 110. The first boom end 112 is the proximal boom end 112 and the second boom end 115 is the distal boom end 115. The distal end 115 of the boom 110 is located remote of the proximal end 112. Preferably, the distal end 115 is located above and rearward of the proximal end 112 of the boom 110, as described generally above and as best shown in FIG. 2. A gusset 120 is preferably connected to the receiver 90 and to the lower portion 111 of the boom 110 to provide structural support to the lower portion 111 of the boom 110.

A generally U-shaped bracket 130 is on the bent portion 113 of the boom 110, as best shown in FIGS. 1–4. The U-shaped bracket 130 has a saddle 131 that straddles the bent portion 113 of the boom 110. A first end 132 and an opposed second end 134 forwardly extend from the boom 110. The first and second ends 132 and 134 have respective holes 133 and 135 therethrough. The U-shaped bracket 130 is connected to the boom 110 with one or more welds 137. The saddle 131 provides additional strength, which comes from the tensile strength of the saddle 131. The tensile strength of the saddle 131 and the bond strength of the welds 137 forms a connection between the bracket 130 and boom 110 that securely holds the U-shaped bracket in place.

As stated, the attachment 50 attaches to the three point hitch 15 of a tractor. This attachment is done is a conventional manner. In this regard, the first and second pins 75 and 80 are received within the slots 16 of the three point hitch 15. The U-shaped bracket 130 mates with the attacher 17. A pin or the like can be inserted through the holes 133 and 135 through ends 132 and 134, respectively, and through the attacher 17 to mate the bracket and attacher.

Figure 3:
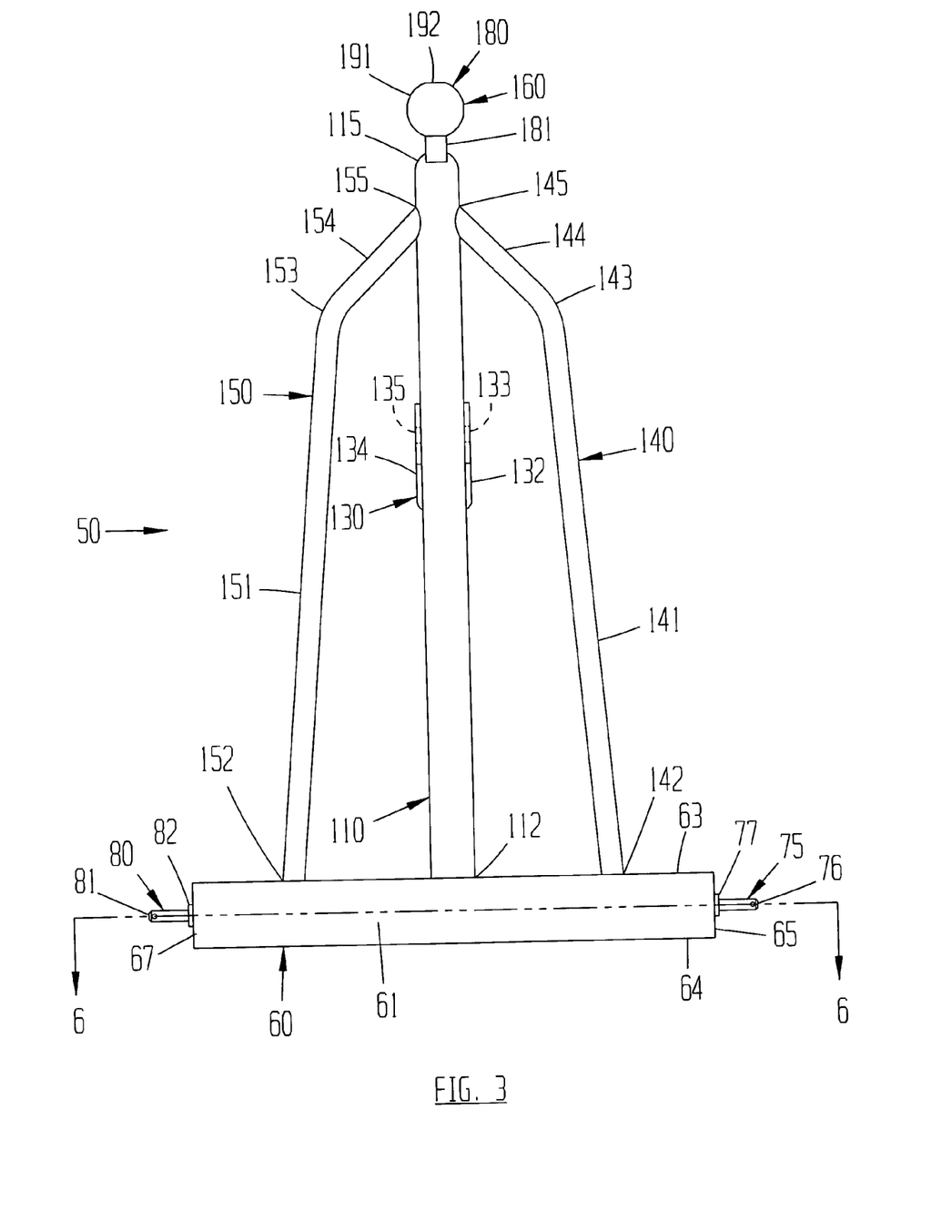
FIG. 3 is a front view of the present invention shown in FIG. 1.
Figure 5:
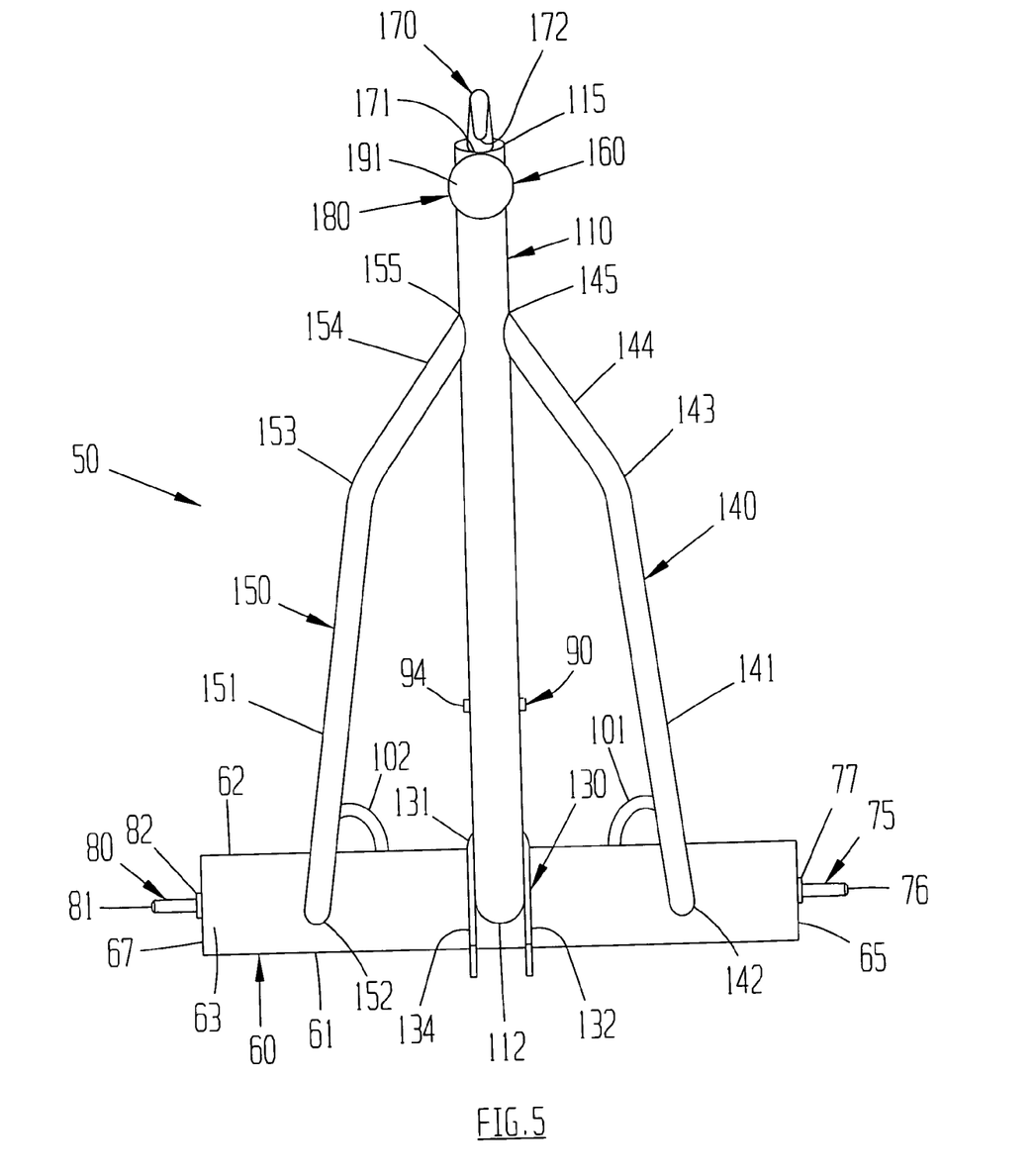
FIG. 5 is a top view of the present invention shown in FIG. 1.

Turning now to another aspect of the present invention, best shown in FIGS. 3–5, a first arm 140 is provided. The first arm 140 can be straight (not shown), but is preferably a bent arm having a lower portion 141, a bent portion 143 and an upper portion 144. The lower portion 141 has an end 142 and the upper portion 144 has an opposed end 145. The first arm 141 interconnects the base 60 and the boom 110. In particular, the first arm lower end 142 is preferably welded to the top 63 of the base 60, intermediate between the boom 110 and the first end 65 of the base 60. The first arm upper end 145 is preferably welded to the boom upper portion 114.

A second arm 150 is also provided. Like the first arm 140, the second arm 150 can be straight (not shown), but is preferably a bent arm having a lower portion 151, a bent portion 153 and an upper portion 154. The lower portion 151 has an end 152 and the upper portion 154 has an opposed end 155. The second arm interconnects the base 60 and the boom 110. In particular, the second arm lower end 152 is preferably welded to the top 63 of the base 60, intermediate between the boom 110 and the second end 67 of the base. The second arm upper end 115 is preferably welded to the boom upper portion 114.

As can be seen in FIG. 4, the boom 110, gusset 120, first arm 140 and second arm 150 create a rigid and stationary truss. The bent arms 140 and 150 support the distal end 115 of the boom without the need for additional braces. Yet, the bent arms 140 and 150 do not interfere with the use of the receiver 90.

One or more connectors 160 are at the distal end 115 of the boom, as best shown in FIGS. 1 and 2. Of the many available connectors, two preferred connectors are a hook 170 and a gooseneck hitch 180. In a preferred embodiment, two connectors 160 are simultaneously connected to boom 110 near its distal end 115.

The hook 170 has an attached end 171 preferably welded to the distal end 115 of the boom 110, and a free end 172 that faces upwards. The hook 170 can engage a chain 231, such as shown in FIG. 9.

A second type of connector 160 is a gooseneck hitch 180. The gooseneck hitch 180 has a shaft 181 with a connected end 182 connected to the boom 110, as explained in further detail below. The shaft 181 has an opposed free end 183. A cross hole 184 is through the shaft 181 near the shaft free end 183. A ball 191 is adapted to fit onto the free end 183 of the shaft 181. The ball 191 has a flat top 192, and a bore 193. A cross hole 194 is through the ball 190. The ball 191 is selectively slideable onto the shaft 181, such that the shaft free end 183 extends into the bore 193 of the ball. Cross hole 194 of the ball is alignable with cross hole 184 of the shaft 180, and a pin 197 can extend through those holes to removeably secure the ball 190 to the shaft 181. As an alternative, the ball 190 can be welded to the shaft 181 to permanently secure the gooseneck hitch 180 to the boom 110.

Figure 7:
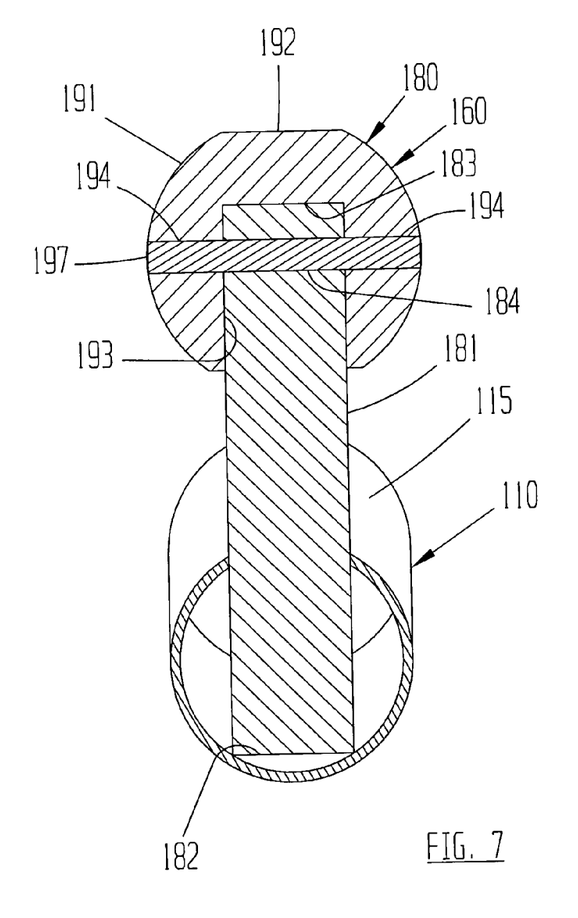
FIG. 7 is a cross-sectional view of the gooseneck hitch taken along line 7—7 in FIG. 2.

The shaft 181 is connected to the boom 110 at the boom distal end 115. As shown in FIG. 7, the shaft 181 extends into the boom 110 and abuts the opposite inside surface of the boom 110. The shaft 181 is welded to the inside surface of the boom 110, and also is welded to the boom where the shaft 181 extends from the boom 110. Affixing the shaft 181 into the boom 110 in this manner strongly holds the shaft in place.

Figure 9:
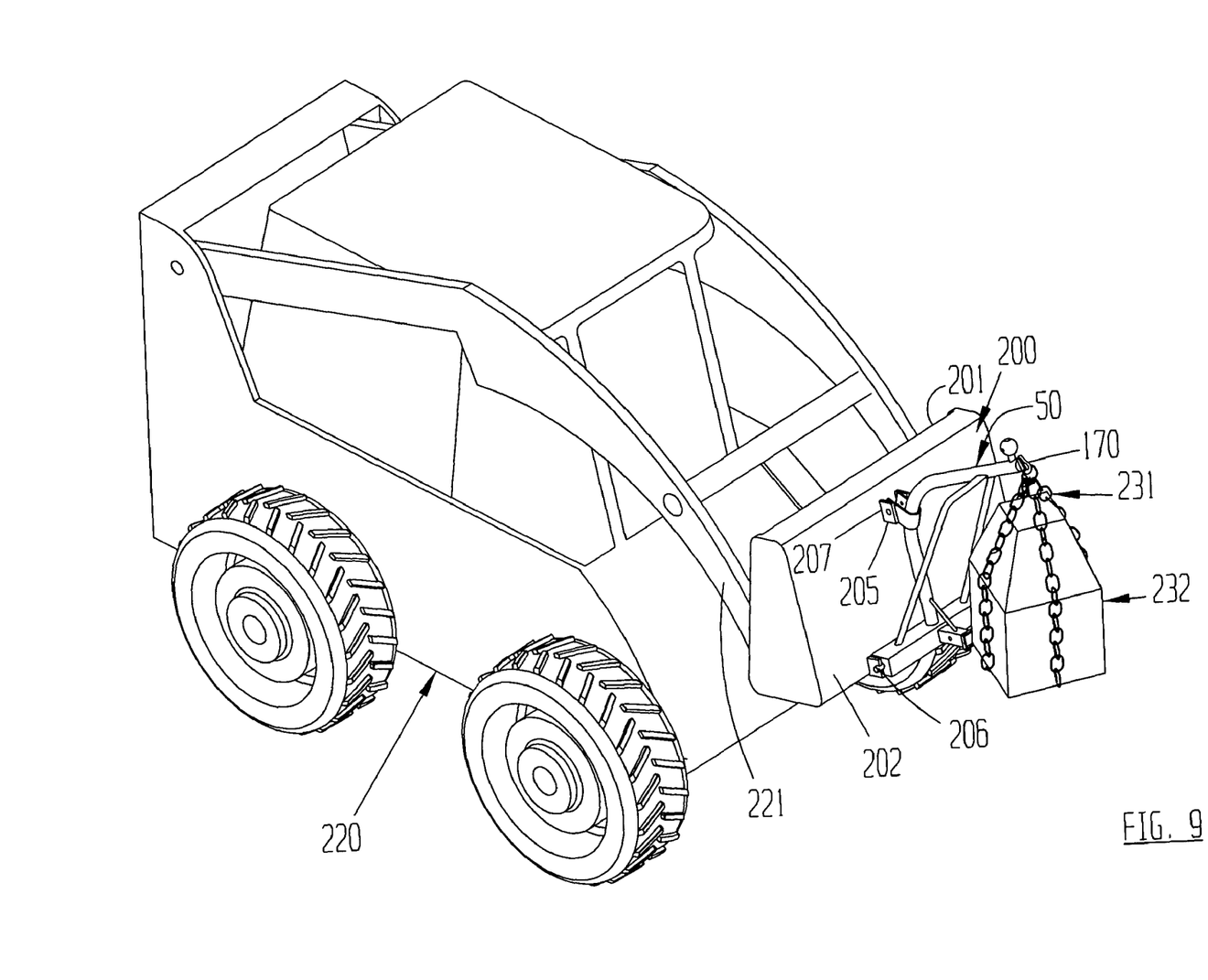
FIG. 9 is a perspective view of the present invention aligned with a removable three point adapter plate, which is in turn attachable to a skid loader, and using the hooked boom.
Figure 10:
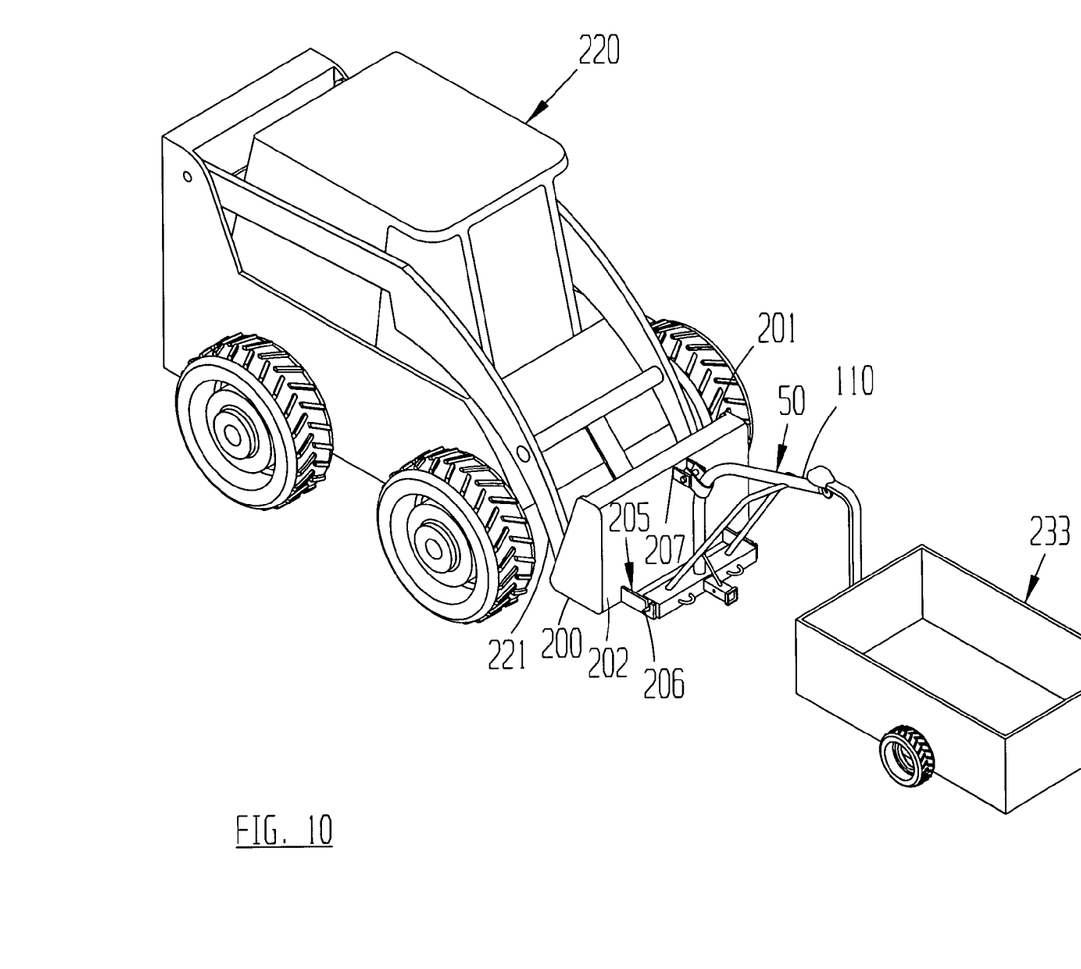
FIG. 10 is similar to FIG. 9, but shows use of the gooseneck hitch of the present invention.

In accordance with another aspect of the present invention shown in FIGS. 9 and 10, an adapter plate 200 is provided. The adapter plate 200 has a front 201 and a back 202. The back 202 has a three point hitch 205 similar to three point hitch 15, having slots 206 and an attacher 207. The front 201 of the adapter plate 200 is adapted to connect to a host vehicle 5, such as a skid loader 220. Skid loaders 220 are well understood in the art and have an attacher 221 adapted to removeably connect to the front 201 of the adapter plate 200. Plates such as adapter plate 200 are well known in the art. It is contemplated that adapter plates having three point adapters that are adapted for connecting to other types of host vehicles are also within the scope of the present invention.

In accordance with an additional embodiment (not shown), the attacher of the present invention could be permanently connected to the adapter plate 200, such that the present invention would be directly attachable to a skid loader. This could be accomplished by welding the multi-function apparatus 50 to the adapter plate 200. Also, base 60 could be adapted for use with quick connect systems (not shown) by potentially modifying the design of the pins 75 and 80 and of the bracket 130.

Figure 8:
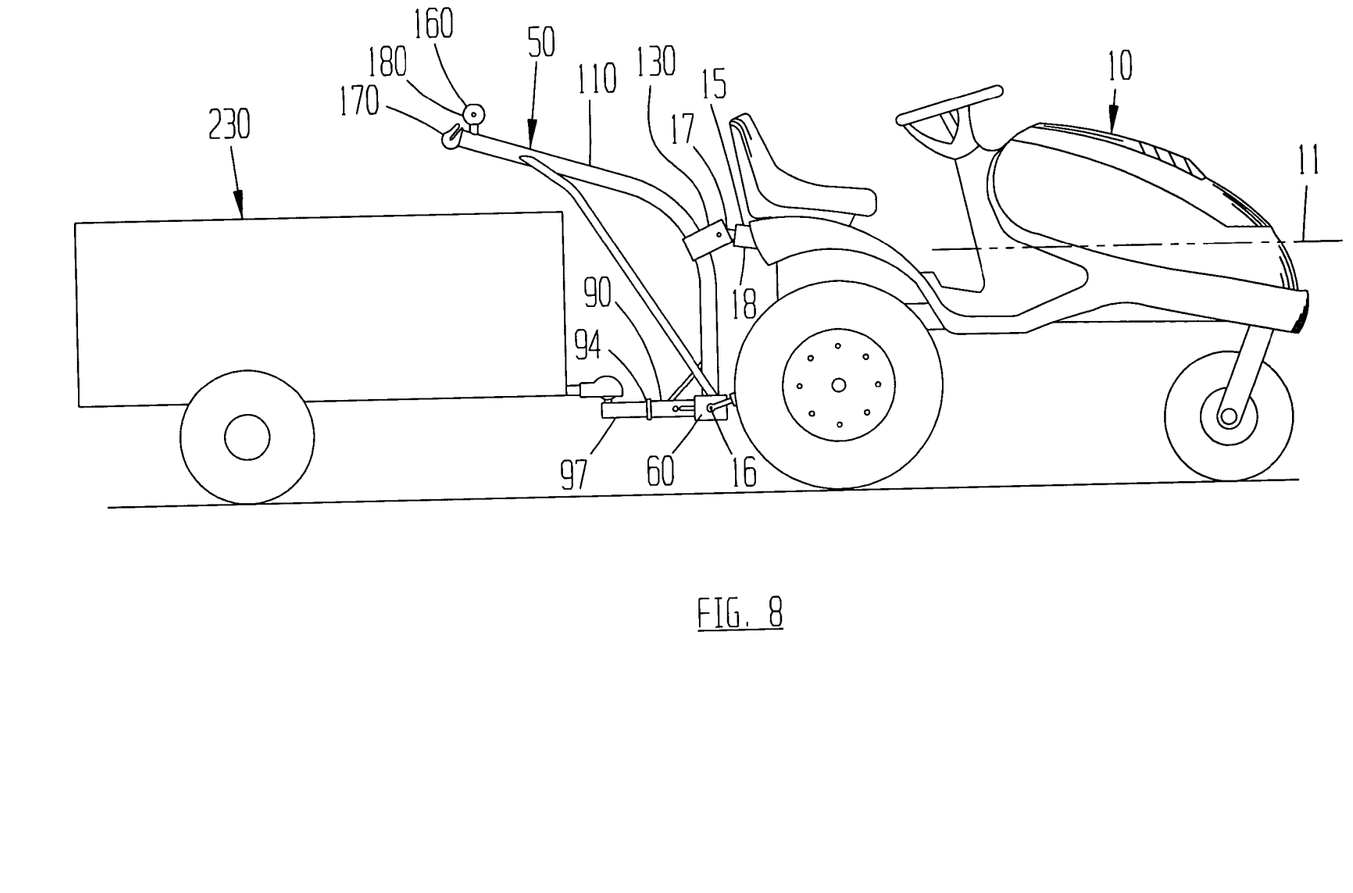
FIG. 8 is a perspective view of the present invention attached to the three point hitch of a tractor and using the receiver.

Turning now to FIG. 8, the attacher 50 of the present invention is shown attached directly to the three point hitch 15 of a tractor 10. A trailer 230 is shown to be attached to a standard hitch 97, which is connected to the receiver 90. The boom 110 and arms 140 and 150 do not interfere with the towing of the trailer 230.

Turning now to FIG. 9, the attacher 50 of the present invention is connected to an adapter plate 200, which is in turn attached to a skid loader 220. A chain 231 supporting a load 232 is hung on the hook 170 at the distal end 115 of the boom 110. The arms 140 and 150 adequately support the distal end 115 end of the boom 110.

Turning now to FIG. 10, the attacher 50 of the present invention is also shown connected to an adapter plate 200, which is in turn attached to a skid loader 220. A gooseneck trailer 233 is shown to be connected to the gooseneck hitch 180. The gooseneck hitch 180 is located rearward from the base 60 of the attacher and in turn, located rearward from the adapter plate 200. Hence, the skid loader 220 can turn without the gooseneck trailer 10 striking the adapter plate 200 while turning.

Thus it is apparent that there has been provided, in accordance with the present invention, a attacher that fully satisfies the objects, aims and advantages as set forth above. While the invention has been described in conjunction with specific embodiments thereof, it is evident that many alternatives, modifications and variations will be apparent to those skilled in the art in light of the foregoing description and the drawings. Accordingly, it is intended to embrace all such alternatives, modifications and variations as fall within the spirit and broad scope of the appended claims.

The invention claimed is:

1. An attacher for attaching to a host vehicle comprising:
   A. a base having a first base end and a second base end;
   B. a receiver extending rearwardly from said base;
   C. a stationary boom having a proximal end connected to said base and a distal end rearward of said base;
   D. a connector connected to said distal end of said boom;
   E. a first pin extending from said first base end; and
   F. a second pin extending from said second base end.

2. The attacher of claim 1 further comprising a pair of arms interconnecting said base and said stationary boom.

3. The attacher of claim 2 wherein:
   A. said boom is bent to form a first boom portion and a second boom portion;
   B. said pair of arms are bent to each have a respective first arm portion and a second arm portion; and
   C. said respective first arm portions are connected to said base and said respective second arm portions are connected to said second boom portions.

4. The attacher of claim 1 wherein said connector is a hook.

5. The attacher of claim 1 wherein said connector is a gooseneck hitch.

6. The attacher of claim 5 wherein said gooseneck hitch comprises:
   A. a shaft rigidly connected to said boom; and
   B. a ball removeably connected to said shaft.

7. The attacher of claim 1 wherein said attacher has a plurality of connectors connected to the distal end of said boom.

8. The attacher of claim 1 wherein said base further comprises at least one plate enclosed within said base for anchoring said first and second pins to said base.

9. The attacher of claim 8 wherein said base comprises:
   A. a first plate enclosed within said base and rigidly connected thereto for anchoring said first pin to said base; and
   B. a second plate enclosed within said base and rigidly connected thereto for anchoring said second pin to said base.

10. The attacher of claim 1 wherein said receiver has a two inch receiver opening for selectably receiving a drawbar.

11. The attacher of claim 1 wherein said receiver has an opening that terminates at said base.

12. The attacher of claim 1 further comprising means for selectably connecting said attacher to a skid loader.

13. An attacher for attaching to a host vehicle comprising:
A. a base with a first base end and an opposed second base end;
B. a stationary boom with a proximal end connected to said base and a distal end remote from said proximal end;
C. at least one bent arm interconnecting said base and said boom;
D. a connector at said distal end of said boom; and
E. a receiver connected to said base intermediate between said first base end and said second base end.

14. The attacher of claim 13 wherein said at least one bent arm comprises pair of bent arms interconnecting said base and said boom.

15. The attacher of claim 13 wherein said connector is a hook.

16. The attacher of claim 13 wherein said connector is a gooseneck hitch.

17. The attacher of claim 16 wherein said gooseneck hitch comprises:
A. a shaft on said distal end of said boom; and
B. a ball removeably connected to said shaft.

18. The attacher of claim 13 further comprising a plurality of connectors at said distal end of said boom.

19. The attacher of claim 13 further comprising:
A. a first chain eye connected to said base between said first base end and said boom; and
B. a second chain eye connected to said base between said second base end and said boom.

20. The attacher of claim 13 further comprising a gusset interconnecting said receiver and said boom.

21. The attacher of claim 13 wherein said boom is a bent boom comprising a first boom portion and a second boom portion, wherein said second boom portion extends rearward of said base.

22. The attacher of claim 21 wherein said at least one arm comprises a pair of bent arms interconnected to said base and said second boom portion of said bent boom.

23. The attacher of claim 13 further comprising a plate connected to said attacher; said plate being shaped to be selectively engaged by a skid loader.

24. An attacher comprising:
A. a base having a pair of pins anchored thereto;
B. a receiver rearwardly extending from said base and having a receiver opening terminating at said base;
C. a boom having a proximal end connected to said base and a distal end rearward of said base, said boom having a U-shaped bracket thereon; and
D. a connector at said distal end of said boom,
wherein said pair of pins and said U-shaped bracket are used to connect said attacher to a host vehicle.

25. The attacher of claim 24 wherein said boom is stationary with respect to said base, and is permanently connected to said base.

26. The attacher of claim 25 wherein:
A. said boom comprises a boom first portion and a boom second portion, said boom second portion extending rearward from said base; and
B. said attacher further comprising a pair of arms that interconnect said boom second potion and said base.

27. The attacher of claim 26 wherein said pair of arms is a pair of bent arms.

28. The attacher of claim 24 wherein said connector is a hook.

29. The attacher of claim 24 wherein said connector is a gooseneck hitch.

30. The attacher of claim 24 wherein said receiver is a two inch receiver.

31. The attacher of claim 24 further comprising an adapter plate for receiving said pair of pins and said U-shaped bracket, wherein said adapter plate is connectable to a skid loader.

32. An attacher comprising:
A. a base having a first base end and a second base end;
B. a first pin directly connected to and extending from said first base end;
C. a second pin directly connected to and extending from said second base end;
D. at least one plate being within said base and anchoring at least one of said first pin and said second pin to said base;
E. a boom having a first boom end connected to said base and a second boom end remote from said first boom end; and
F. a connector at said second boom end,
wherein said boom is directly connected to said base, and said attacher is further comprising a U-shaped bracket connected to said boom.

33. The attacher of claim 32 wherein said connector is a hook.

34. The multi-function machine of claim 32 wherein said at least one plate comprises:
A. a first plate for anchoring said first pin to said base; and
B. a second plate for anchoring said second pin to said base.

35. An attacher comprising:
A. a base having a first base end and a second base end;
B. a first pin at said first base end and a second pin at said second base end;
C. a boom connected to said base and having a connector connected thereto, said boom being stationary with respect to said base, and said boom having a boom first portion upstanding from said base and a boom second portion extending rearward from said first boom portion and said base;
D. a generally U-shaped bracket around said boom; and
E. a pair of bent arms that interconnect said base and said boom second portion,
wherein said first pin, said second pin, and said generally U-shaped bracket are connectable to a three point hitch.

36. The attacher of claim 35 wherein:
A. said first pin extends from said base first end;
B. said second pin extends from said base second end; and
C. at least one plate is enclosed within said base for anchoring at least one of said first pin and said second pin to said base.

37. The attacher of claim 35 further comprising a receiver extending rearwardly from said base.

38. The attacher of claim 35 wherein said connector is a hook.

39. An attacher for attaching to a host vehicle comprising:
A. a base with a first base end and an opposed second base end;
B. a stationary boom with a proximal end connected to said base and a distal end remote from said proximal end;
C. at least one bent arm interconnecting said base and said boom;
D. a connector at said distal end of said boom;
E. a first pin extending from said first base end; and
F. a second pin extending from said second base end, wherein said base further comprises at least one plate contained within said base for anchoring said first pin and said second pin.

40. The attacher of claim 39 further comprising a U-shaped plate connected to said boom.

41. An attacher comprising:
A. a base having a first base end and a second base end;
B. a first pin directly connected to and extending from said first base end;
C. a second pin directly connected to and extending from said second base end;
D. at least one plate being within said base and anchoring at least one of said first pin and said second pin to said base;
E. a boom having a first boom end connected to said base and a second boom end remote from said first boom end; and
F. a connector at said second boom end, wherein said connector is a gooseneck hitch.

42. An attacher comprising:
A. a base having a first base end and a second base end;
B. a first pin directly connected to and extending from said first base end;
C. a second pin directly connected to and extending from said second base end;
D. at least one plate being within said base and anchoring at least one of said first pin and said second pin to said base;
E. a boom having a first boom end connected to said base and a second boom end remote from said first boom end and rearward of said base;
F. a connector at said second boom end; and
G. a pair of bent arms interconnecting said base to said boom at a location on said boom located rearward of said base.

43. An attacher comprising:
A. a base having a first base end and a second base end;
B. a first pin directly connected to and extending from said first base end;
C. a second pin directly connected to and extending from said second base end;
D. at least one plate being within said base and anchoring at least one of said first pin and said second pin to said base;
E. a boom having a first boom end connected to said base and a second boom end remote from said first boom end;
F. a connector at said second boom end; and
G. a receiver extending rearward from said base.

44. An attacher comprising:
A. a base having a first base end and a second base end;
B. a first pin at said first base end and a second pin at said second base end;
C. a boom connected to said base and having a connector connected thereto, said connector being a gooseneck hitch; and
D. a generally U-shaped bracket around said boom,
wherein said first pin, said second pin, and said generally U-shaped bracket are connectable to a three point hitch.

* * * * *